Dec. 15, 1931.  I. HECHENBLEIKNER ET AL  1,836,166
CATALYTIC APPARATUS
Filed Feb. 9, 1929
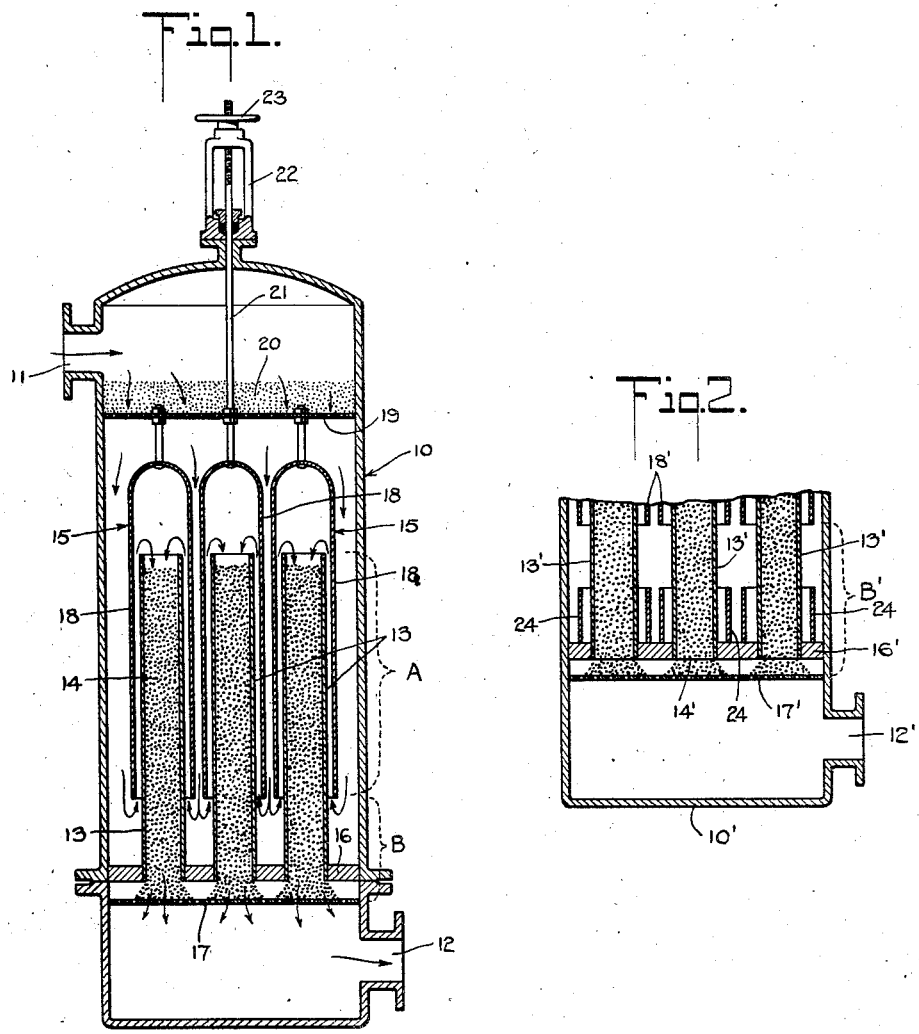
INVENTOR
INGENUIN HECHENBLEIKNER
NICOLAY TITLESTAD
BY
ATTORNEY Patented Dec. 15, 1931

1,836,166

UNITED STATES PATENT OFFICE

INGENUIN HECHENBLEIKNER AND NICOLAY TITLESTAD, OF CHARLOTTE, NORTH CAROLINA, ASSIGNORS, BY MESNE ASSIGNMENTS, TO CHEMICAL CONSTRUCTION CORPORATION, A CORPORATION OF DELAWARE

CATALYTIC APPARATUS

Application filed February 9, 1929. Serial No. 338,838.

This invention relates to a converter system or catalytic apparatus, and relates more particularly to a converter apparatus for carrying out catalytic reactions in the vapor phase; and has special reference to the provision of a converter system adapted for use in the catalytic oxidation of sulphur dioxide.

In catalytic apparatus, particularly of the types employed for oxidizing sulphur dioxide in the contact method of producing sulphuric acid, it is requisite to keep the temperatures under control not only in the catalyst mass which is subjected to the fresh reaction gases, but also in the last catalyst layers or sections which are required to effect the last few percent of reaction. This is due to the fact that the catalytic reaction is relatively sensitive to temperature; and too high a temperature in the latter portions of the catalyst mass or in the last catalyst layers results in a reversible reaction or reversion of the gases and hence in an incomplete oxidation process. The efficiency of the converter system as a whole will therefore be retarded by an increase of temperature above a certain optimum. On the other hand, decreasing temperatures will result in greatly retarding the velocity of the reaction and in rendering necessary a larger amount of contact substance or mass. In order to obtain maximum efficiency with minimum of contact substance, it is hence desirable to permit the reaction to take place at a higher temperature than the optimum for maximum conversion at the start or initial stages of the reaction and to materially diminish the temperatures at the end of the reaction process down to a point near the optimum temperature for maximum conversion.

For accomplishing the regulation or control of the temperatures in such catalytic reactions, it has heretofore been suggested, as set forth in Letters Patent to Knietsch Nos. 652,119; 688,020 and 823,472, to arrange the catalyst mass in columns or pipe systems in which the reaction heat is removed by a current of air or gas passing outside of the pipes which carry the reaction mass, heat exchange or cooling of the contact mass being also arranged between incoming gas and the reaction mass. This type of construction, however, suffers the disadvantage that one can not completely control the last stages of the reaction satisfactorily, for which reason the efficiency is not as high as desired or as may be obtained. This is particularly true when it is desired to control the travel of the reaction gases in large units.

To obviate this disadvantage, it has also been suggested, as set forth in the Letters Patent to Jaeger No. 1,660,511 of Feb. 28, 1928, to subdivide the reaction process into a plurality of stages employing two or more separated converters arranged in series, the temperatures of the separated converters being differently controlled or regulated, this so as to effect a greater efficiency in the completion of the exothermic reactions which take place. For effecting the desired control, therefore, this type of apparatus requires a multiplication of the converters.

We have discovered that a very efficient heat exchange and an almost complete temperature control may be obtained in one continuous operation employing only a single converter apparatus. We have found that by suitably designing and constructing the heat exchange system in the converter, the same may be subdivided into two easily regulatable sections, in one of which an intense cooling of the reaction mass may be effected, this at the initial stages of the reaction process, and in another of which a diminished and moderate cooling may be effected, this latter for the last stages of the reaction. We have further determined that in such a single unit converter, almost perfect control or regulation of the temperatures under varying conditions may be obtained by adjusting the space relation between the two regions or sections into which the converter is thus subdivided and that this may be accomplished during the running operation of the converter in a very simple way. The prime desideratum of our present invention therefore centers about the provision of a converter apparatus for accomplishing these objects.

To the accomplishment of the foregoing and such other objects as will hereinafter appear, our invention relates to the elements and their relation one to the other as hereinafter more particularly described and sought to be defined in the claims; reference being had to the accompanying drawings, which show the preferred embodiment of our invention, and in which:

Fig. 1 is a vertical elevational view taken in cross-section of a converter system embodying the principles of our invention, and Fig. 2 is a vertical elevational view of a fragmentary section of a modification thereof.

Referring now more in detail to the drawings, and having reference first to Fig. 1 thereof, the converter system of our invention comprises a converter chamber generally designated as 10 having entrant and exit openings 11 and 12 respectively for the reaction gases, a plurality of receptacles or columns 13, 13 in said chamber, each column containing a catalyst mass 14 and a cooling apparatus generally designated as 15 for controlling the reaction temperatures developed by the reactions in said columns 13.

The cooling apparatus 15, in accordance with the principles of our invention, comprises means subdividing the free space in said converter chamber 10 into a path for the flow of the reaction gases from the entrant opening 11 to and about the columns 13 and then through said columns and the contact mass therein and to the exit opening 12, all as indicated by the arrows in Fig. 1 of the drawings, the space about said columns being subdivided by this means to provide two regions, one region generally designated by the bracket A producing a high gas velocity about one section of said columns to effect an intense cooling of said section, and the other a region generally designated by the bracketed section B producing a very low gas velocity about another section of said column to effect a moderate and diminishing cooling of said other section.

In the preferred construction of the apparatus, the columns 13 comprise tubes open at their opposite ends supported at one of their ends by the plate 16 affixed to the lower end of the chamber 10, below which plate there is preferably placed a screen 17 for supporting the contact mass 14. At the screen the contact mass disposes itself in frusto-conical formation, as indicated in Fig. 1 of the drawings, this arrangement making for a more uniform discharge of the gases and affording an arrangement wherein the contact mass will be partially cooled from the screen 17, thereby removing the heat of reaction from the contact mass at the exit.

The cooling system 15 is in the preferred construction provided by a second set of tubes 18, 18 open only at one of their ends and therefore forming bell-shaped structures, which tubes are placed over the contact mass tubes 13 to envelop the same over the section A thereof, as clearly shown in Fig. 1 of the drawings. For obtaining the desired optimum control of the temperatures under various conditions, as heretofore referred to, the envelop tubes 18 are made adjustable so that the space relation between the intense cooling region A and the moderate cooling region B may be varied; and to accomplish this the tubes 18 are attached to and hung from a screen 19 arranged at the entrant opening 11, which screen may be used for supporting a mass 20 for filtering the incoming gases, the adjustment of said tube being effected by means of a rod 21 screw threaded at its top and suspending the tubes 18 and the screen 19 from a yoke 22 carrying a hand wheel 23 which is in threaded engagement with the upper end of the rod 21, the rotation of which hand wheel causes the ascending or descending movement of the tubes 18 as a unit. Where the means for adjusting the envelop tubes is arranged outside of the converter as shown, the adjustment, as will be obvious, may be made during running operation of the system. However, it will be understood that the tube adjustment may be otherwise arranged, as for example inside the converter, and the tubes set properly for any desired capacity or predetermined conditions.

The functioning and the advantages of the converter of our invention will be apparent from a consideration of the gas flow produced and of the heat transmission and heat exchange conditions effected. The reaction gases enter the converter at the entrant opening 11, passing down through the filter mass 20 and then downwardly over the exterior walls of the envelop tubes 18 to the bottom of the converter, after which the gases move upwardly in the space between the contact mass tubes 13 and the envelop tubes 18, after which the gases move for reaction through the tubes or columns 13 and the contact mass 14 therein, all of the stages of the reaction taking place in said columns to produce the completely reacted gases which are withdrawn from the exit opening 12. The contact mass 14 with this arrangement receives a very intensive cooling in the section A of the contact mass tubes due to the high velocity of the gases flowing in the space between the contact mass tubes and the envelop tubes. In this section the main reaction takes place by liberation of the largest degree of heat, the maximum heat liberation taking place at the tops of the tubes or columns 13 where the incoming gases heated by contact with the outside walls of the tubes 13 are also the hottest. As the gases pass downwardly through the contact mass tubes 13, they are cooled further and the velocity of reaction diminishes as the optimum conversion efficiency is approached.

As heretofore set forth, for effecting an efficient completion of the reaction it is essential to provide a diminishing cooling and a moderate cooling in the last stages of reaction. This is accomplished in the section B of the converter, wherein the contact mass tubes are not enveloped, and wherein, therefore, a gas space is provided having a very low gas velocity forming in effect a zero or dead velocity space, and wherein only a small amount of heat is radiated from the tubes 13 to the surrounding gaseous atmosphere. As is known, the heat transmission between a heater wall and a surrounding gas increases according to the formula:

$$x = 2 + 10\sqrt{v},$$

where $v$ is the velocity of the gas in volume per unit time. It will therefore be understood that the higher the envelop tubes 18 are lifted, the less will be the movement of the gas velocity in the gas surrounding the bottom section of the tubes 13 (the region B), and hence the larger the moderate cooled part of the contact mass tubes. The envelop tubes 18 forming in an entirety the cooling system 15 may therefore be pre-adjusted to suit the desired capacity of the plant or the operating conditions thereof by fixing or regulating the high gas velocity heat exchange area between the tubes, and it will be further seen that by adjusting the cooling system an optimum control of temperature can readily be obtained under varying conditions of operation.

In Fig. 2 of the drawings we show a modified form of the invention in which parts similar to the apparatus shown in Fig. 1 are designated by similar and primed reference characters, and in which the contact mass tubes 13' are further protected by the enveloping tube structures 24, 24 arranged on the bottom plate 16'. In this modified construction the gas moving in the region B' is still further retarded, thereby giving a still more moderate cooling at the last stages of reaction for obtaining maximum efficiency.

It will be apparent that numerous changes may be made in the construction without departing from the principles of the invention described. It will be understood, for example, that the system will work equally well with a reverse arrangement wherein the tubes are regulated from below, at which point the gases would enter. The system provided is applicable to all kinds of exothermic reactions and varying kinds of contact substances and in particular to such contact masses as platinum and vanadium utilized for converting sulphur dioxide into sulphur trioxide. It will be understood that various other modifications are contemplated by the invention as set forth in the appended claims.

We claim:

1. A converter system comprising a chamber having entrant and exit openings for the reaction gases, a column in said chamber containing a catalyst mass, and a cooling apparatus for controlling the reaction temperatures developed in said column, said cooling apparatus comprising means subdividing the space in said chamber into a path for the flow of the reaction gases from said entrant opening to and about said column and then through said column and to said exit opening, the space about said column being subdivided to provide two regions, one a region producing a high gas velocity about one section of said column to effect an intense cooling of said section and the other a region producing a very low gas velocity about another section of said column to effect a diminished and moderate cooling of said other section, and means for adjusting the space relation between said two regions.

2. A converter system comprising a chamber having entrant and exit openings for the reaction gases, a column in said chamber containing a catalyst mass, and a cooling apparatus for controlling the reaction temperatures developed in said column, said cooling apparatus comprising an envelop for one section of said column subdividing the space in said chamber about said column into a path for the flow of the reaction gases from said entrant opening to the space surrounding said envelope, then to and about said column and then through said column and to said exit opening, said envelop dividing the space about said column into two regions, one a region producing a high gas velocity about said one section of said column to effect an intense cooling of said section and the other a region producing a very low gas velocity about another section of said column to effect a diminished and moderate cooling of said other section.

3. The combination of claim 2 in which the envelop is adjustable to vary the relation between said two regions.

4. A converter system comprising a chamber having entrant and exit openings for the reaction gases, a column in said chamber containing a catalyst mass and open at its opposite ends, and a cooling apparatus for controlling the reaction temperatures developed in said column, said cooling apparatus comprising a bell envelop arranged over said column and terminating intermediate the ends of said column, said envelop subdividing the space in said chamber into a path for the flow of the reaction gases from said entrant opening to the space surrounding said envelope, then to and about said column and then through said column and to said exit opening, the space about said column being subdivided by said envelop into two regions, one a region producing a high gas velocity about the enveloped section of said column to effect an intense cooling of said section and the other a region producing a very low gas velocity about the non-enveloped section of said column to effect a diminshed and moderate cooling of said non-enveloped section.

5. The converter system of claim 4 including a plurality of columns, each provided with an envelop and means for simultaneously moving a plurality of envelops longitudinally of the columns.

6. In the converter system of claim 4, means for adjusting the position of the envelop relatively to the column to vary the relation between said two regions.

7. A converter system comprising a chamber having entrant and exit openings for the flow of the reaction gases, a tube in said chamber containing the contact mass and open at its opposite ends to the gas flow, a second tube open only at one end to the gas flow arranged over the contact mass tube, and means for adjusting one of said tubes with respect to the other for regulating the high gas velocity heat exchange area between the tubes.

8. A converter system comprising a chamber having entrant and exit openings for the flow of the reaction gases, a tube in said chamber containing the contact mass and open at its opposite ends to the gas flow, a second tube open only at one end to the gas flow arranged over one end of the contact mass tube, and means for adjusting the second tube with respect to the contact mass tube for regulating the high gas velocity heat exchange area between the tubes.

9. A converter system comprising a chamber having entrant and exit openings for the flow of the reaction gases, a tube in said chamber containing the contact mass and open at its opposite ends to the gas flow, a second tube open only at one end to the gas flow arranged over the contact mass tube, a screen attached to the second tube and arranged between the same and said entrant opening, a filter mass supported on said screen, and means for adjusting one of said tubes with respect to the other for regulating the high gas velocity heat exchange area between the tubes.

10. A converter system comprising a chamber having entrant and exit openings, a supporting plate in said chamber, a set of tubes supported at one of their ends by said plate, said tubes containing the contact mass and each of said tubes being open at its opposite ends to the gas flow, a second set of tubes each open only at one end of the gas flow and each arranged over one of said contact mass tubes, and a screen below said plate supporting the contact mass in said first set of tubes.

11. A converter system comprising a chamber having entrant and exit openings, a supporting plate in said chamber, a set of tubes supported at one of their ends by said plate, said tubes containing the contact mass and each of said tubes being open at its opposite ends to the gas flow, a second set of tubes each open only at one end of the gas flow and each arranged over one of said contact mass tubes, and means for adjusting the second set of tubes relatively to the first set of tubes.

12. A converter system comprising a chamber having entrant and exit openings, a supporting plate in said chamber, a set of tubes supported at one of their ends by said plate, said tubes containing the contact mass and each of said tubes being open at its opposite ends to the gas flow, a second set of tubes each open only at one end of the gas flow and each arranged over one of said contact mass tubes, the said second set of tubes being adjustable, a screen below said plate supporting the contact mass in said first set of tubes, and a screen attached to said second set of tubes arranged between the same and said entrant opening, the last mentioned screen holding a filter mass.

13. A converter system comprising a chamber having entrant and exit openings for the reaction gases, a column in said chamber containing a catalyst mass, and a cooling apparatus for controlling the reaction temperatures developed in said column, said cooling apparatus comprising an envelop for one section of said column subdividing the space in said chamber about said column into a path for the flow of the reaction gases from said entrant opening to and about said column and then through said column and to said exit opening, said envelop dividing the space about said column into two regions, one a region producing a high gas velocity about said one section of said column to effect an intense cooling of said section and the other a region producing a very low gas velocity about another section of said column to effect a diminished and moderate cooling of said other section, and means for adjusting the said envelop to vary the relation between said two regions.

14. A converter system comprising a chamber having entrant and exit openings for the reaction gases, a plurality of columns in said chamber each containing a catalyst mass and open at its opposite ends, and a cooling apparatus for cooling the reaction temperatures developed in said columns, said cooling apparatus comprising a bell envelop for each of said columns, each envelop being arranged over its column and terminating intermediate the ends of its column, the said envelops subdividing the space in said chamber into a path for the flow of the reaction gases from said entrant opening to and about said columns and then through said columns and to said exit opening, the space about said columns being subdivided by said envelop into two regions, one a region producing a high gas velocity about the enveloped section of said columns to effect an intense cooling of said section, and the other a region producing a very low gas velocity about the non-enveloped section of said columns to effect a diminished and moderate cooling of said non-enveloped section, and means for simultaneously moving the plurality of envelopes longitudinally of the columns.

Signed at Charlotte, in the county of Mecklenburg and State of North Carolina, this 1st day of Feb., A. D. 1929.

INGENUIN HECHENBLEIKNER.
NICOLAY TITLESTAD.